US005096780A

United States Patent [19]

Finter et al.

[11] Patent Number: 5,096,780

[45] Date of Patent: Mar. 17, 1992

[54] ELECTRICALLY CONDUCTIVE COATING COMPRISING A NEEDLE NETWORK OF CHANGE TRANSFER COMPLEXES

[75] Inventors: Jürgen Finter, Freiburg, Fed. Rep. of Germany; Bruno Hilti, Basel, Switzerland; Carl W. Mayer, Riehen, Switzerland; Ernst Minder, Sissach, Switzerland

[73] Assignee: Ciba-Geigy Corporation, Ardsley, N.Y.

[21] Appl. No.: 411,948

[22] Filed: Sep. 25, 1989

[30] Foreign Application Priority Data

Sep. 30, 1988 [CH] Switzerland ........................ 3647/88

[51] Int. Cl.[5] .......................... B32B 5/16; B32B 9/00; B32B 15/02

[52] U.S. Cl. ................................ 428/407; 428/411.1; 428/426; 540/1

[58] Field of Search .................... 540/1; 428/704, 426, 428/411.1, 407

[56] References Cited

U.S. PATENT DOCUMENTS

| | | | |
|---|---|---|---|
| 3,403,165 | 9/1968 | Matsunaga | 549/31 |
| 3,636,048 | 1/1972 | Klingsberg | 549/31 |
| 4,384,025 | 5/1983 | Hilti et al. | 428/411 |
| 4,522,754 | 6/1985 | Hilti et al. | 260/239 R |
| 4,601,853 | 7/1986 | Hilti et al. | 260/239 R |
| 4,617,151 | 10/1986 | Mayer et al. | 540/1 |
| 4,801,701 | 1/1989 | Hilti et al. | 540/1 |

OTHER PUBLICATIONS

Pure & Applied Chemistry, 56(3), 355–368 (1984).
Organometallics, 3, 732–735 (1984).

*Primary Examiner*—Merrell C. Cashion, Jr.
*Assistant Examiner*—D. S. Nakarani
*Attorney, Agent, or Firm*—Kevin T. Mansfield

[57] ABSTRACT

Substituted or unsubstituted tetrathio-, tetraseleno- or tetratelluronaphthalenes or -tetracenes form electrically conducting networks of crystal needles with electron acceptors, in particular with halogen-containing organic compounds, on a substrate. These needle networks can be coated electrolytically with metals and/or can be peeled off together with polymers from the substrate in the form of films which are electrically conducting on one side.

10 Claims, No Drawings

ELECTRICALLY CONDUCTIVE COATING COMPRISING A NEEDLE NETWORK OF CHANGE TRANSFER COMPLEXES

The invention relates to a support material consisting of a substrate which is coated on at least one surface with a needle network of crystal needles of a charge-transfer complex (CT complex) of a tetrathio-, tetraseleno- or tetratelluronaphthalene or -tetracene and an electron acceptor; to polymer films in which such a needle network is embedded in a surface; to processes for the preparation of these materials and their use as electric conductors.

J. C. Stark et al. describe, in Organometallics 3, p. 732-735 (1984), peri-dichalcogenized polyacene, certain salts of which have high electric conductivity. U.S. Pat. No. 4,384,025, U.S. Pat. No. 4,522,754, German Offenlegungsschrift 3,510,072, German Offenlegungsschrift 3,635,124 and EP-A 0,153,905 describe this type of halides. These halides have in general a melting point of above 300° C. Furthermore, they are virtually insoluble in organic solvents. As a result of these properties, the halides can be incorporated in polymers or applied to substrates only in the form of powders. Such polymer compositions or coated substrates have only low electric conductivity, since the conducting particles are isolated in the polymer matrix or the layer on a substrate has many contact sides which increase the resistance.

The invention relates to a support material which is coated on at least one of the surfaces of a substrate with a needle network of a CT complex of a) a compound of the formula I or Ia or mixtures thereof as donor (I)

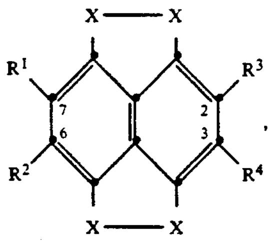

, (Ia)

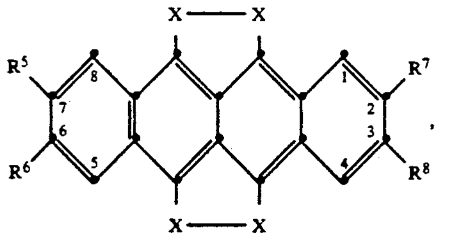

, in which X is S, Se or Te, $R^1$, $R^2$, $R^3$ and $R^4$, independently of one another, are a hydrogen atom or Cl, or $R^1$ and $R^2$ and $R^3$ and $R^4$ together are each

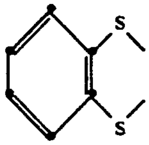

or

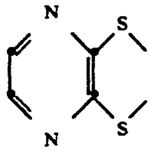

or $R^1$, $R^2$, $R^3$ and $R^4$ are each phenylthio, 4-methyl- or 4-methoxyphenylthio or 4-pyridylthio, $R^5$, $R^6$, $R^7$ and $R^8$, independently of one another are H or F, $R^5$ is $CH_3$ and $R^6$, $R^7$ and $R^8$ are H or $R^5$, $R^6$, $R^7$ and $R^8$, are $CH_3$, $R^5$ and $R^6$ are $CH_3$ or Cl and $R^7$ and $R^8$ are H or $R^5$ and $R^6$ are H, $R^7$ is —$COR^9$ and $R^8$ is H or —$COR^9$, or $R^5$ and $R^6$ are H and $R^7$ and $R^8$ together are —CO—O—CO or —CO—$NR^{10}$—CO— in which $R^9$ is halogen, —OH, —$NH_2$, or the radical of an alcohol, primary or secondary amine, or is —OM in which M is a cation, and $R^{10}$ is H or the radical of a primary amine minus the $NH_2$ group, and b) an electron acceptor.

Some compounds of component a) and their preparation are described in the abovementioned publications. Preferred compounds of component a) are tetrathiotetracene, tetraselenotetracene, 2-fluoro- or 2,3-difluorotetraselenotetracene. Preferred mixtures are those consisting of compounds of the formulae I and Ia, the compound of the formula I being particularly 2,3,6,7-tetrathiophenyltetrathionaphthalene. Particularly preferably, component a) is tetraselenotetracene.

The novel compounds of the formula II or IIa (II)

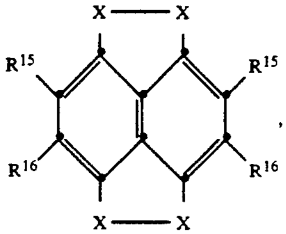

, (IIa)

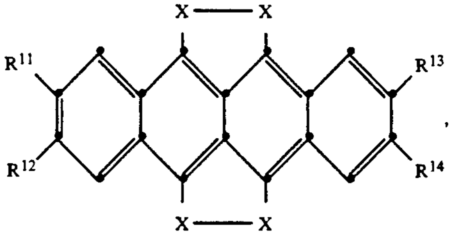

, in which $R^{15}$ and $R^{16}$ are each phenylthio, 4-methyl- or 4-methoxyphenylthio or 4-pyridylthio or in which $R^{15}$ and $R^{16}$ together are

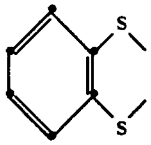

or

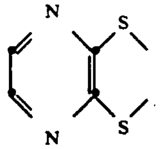

$R^{11}$ is —$CH_3$ and $R^{12}$, $R^{13}$ and $R^{14}$ are H, $R^{11}$ and $R^{12}$ are Cl or $CH_3$, and $R^{13}$ and $R^{14}$ are H, or $R^{11}$, $R^{12}$, $R^{13}$ and $R^{14}$ are —$CH_3$ or F, and X is S, Se or Te, can be prepared, for example, as described below:

a) Tetramethylated tetracenes

The known starting compounds 4,5-dimethylphthalic anhydride and 2,3-dimethyl-6,7-dihydroxynaphthalene are reacted in the presence of $B_2O_3$ to give 2,3,8,9-tetramethyl-5,12-dihydroxy-6,12-dioxotetracene (A). The reaction and the further chlorination and reduction to the product tetrachlorinated in the 5,6,11,12-position are described in German Offenlegungsschrift 3,635,124. The reaction with $Na_2X_2$ leads to the corresponding tetrachalcogenized tetracene. In a variation, the 2,3,8,9-tetramethyl-5,5,6,11,12,12-hexachlorodihydrotetracene (which is obtained by chlorination with $PCl_5/POCl_3$) can be reacted directly with 1 equivalent of $Na_2Se_2$ and 2 equivalents of $Na_2Se$ to the corresponding tetraselenotetracene. Compound A can also be alkylated with dimethyl sulfate to give the 5,12-dimethoxy derivative [cf. Chem. Pharm. Bull. 20(4), 827 (1972)]. The reaction of this derivative with $P_4S_{10}$ in tetrahydrofuran, subsequent oxidation with $Br_2$, followed by reduction with $TiCl_3$ leads to 2,3,8,9-tetramethyl-5,6,11,12-tetrathiotetracene.

b) 2-Methyltetracene

2-Methyl-5,12-dioxodihydrotetracene is obtained in accordance with the procedure in Chem. Ber. 64, 1713 (1931). The reduction with zinc in alkaline solution leads to 2-methyl-5,12-tetrahydrotetracene, which can be dehydrogenated with chloranil to 2-methyltetracene. The reaction with S (see U.S. Pat. No. 3,723,417) gives 2-methyl-5,6,11,12-tetrathiotetracene. 2-Methyl-5,6,11,12-tetrachlorotetracene can also be prepared as described in a) and reacted with $Na_2X_2$.

c) Tetrafluorotetracene

In accordance with the procedure in Chem. Ber. 31, 1159 and 1272 (1898), 2,3,8,9-tetrafluoro-5,12-dihydroxy-6,12-dioxotetracene (B) is obtained by condensation of 2,3-difluorophthalic anhydride with succinic acid, followed by treatment of the condensation product with sodium methoxide in ethanol. The further reaction with $PCl_5$ and then with $SnCl_2/CH_3COOH$ to 2,3,8,9-tetrafluoro-5,6,11,12-tetrachlorotetracene is carried out analogously to the procedure in Zhuv. Org. Khim. 15(2), 391 (1979). The reaction with $Na_2X_2$ gives the corresponding 2,3,8,9-tetrafluorotetrachalcogenotetracene. The reduction of compound B with Al in cyclohexanol leads to 2,3,8,9-tetrafluorotetracene, which reacts with sulfur [see Bull. Soc. Chim. 15, 27 (1948)] to 2,3,8,9-tetrafluoro-5,6,11,12-tetrathiotetracene.

d) Naphthalenes

Starting from known (see U.S. Pat. No. 3,769,276) 2,3,6,7-tetrachlorotetrachalcogenonaphthalenes, the corresponding 2,3,6,7-substituted tetrachalcogenonaphthalenes can be obtained by reaction with the potassium salts of thiophenol, 4-methylthiophenol, 4-methoxythiophenol, 4-mercaptopyridine, 1,2-benzodithiol and pyrazine-2,3-dithiol.

e) Dimethyl- and dichlorotetracenes

The procedure as described in a) is repeated, except that 4,5-dimethyl- or 4,5-dichlorophthalic anhydride are reacted as starting compounds with 6,7-dihydroxynaphthalene, and the product is chlorinated with $PCl_5/POCl_3$.

In formulae I, Ia, II and IIa, X is preferably S or Se. Halogen $R^9$ is in particular chlorine. In the radical —OM, M can be a metal cation or ammonium cation. Suitable metal cations are in particular those of the alkali metals and alkaline earth metals, for example $Li^{\oplus}$, $Na^{\oplus}$, $K^{\oplus}$, $Mg^{2\oplus}$, $Ca^{2\oplus}$, $Sr^{2\oplus}$ and $Ba^{2\oplus}$. Furthermore, $Zn^{2\oplus}$ and $Cd^{2\oplus}$ are suitable. Suitable ammonium cations, for example, $NH_4^{\oplus}$ and primary, secondary, tertiary or quaternary ammonium which can preferably contain $C_1$–$C_{12}$alkyl, cyclohexyl, cyclopentyl, phenyl or benzyl groups. The ammonium cations can also be derived from 5- or 6-membered heterocyclic amines, for example piperidine, pyrrole and morpholine.

An alcohol radical $R^9$ is preferably $C_1$–$C_6$alkoxy or $C_2$–$C_6$hydroxyalkoxy, benzyloxy, phenoxy, cyclopentyloxy or cyclohexyloxy.

A primary or secondary amine radical $R^9$ is preferably derived from alkylamines having one or 2 $C_1$–$C_6$alkyl groups. $R^{10}$ is preferably H, $C_1$–$C_{18}$-alkyl, phenyl or benzyl.

An alkyl $R^{10}$ preferably contains 1 to 12 and in particular 1 to 6 C atoms. Examples of alkyl, which can be linear or branched, are: methyl, ethyl, n- or i-propyl, n-, i- or t-butyl, pentyl, hexyl, 2-ethylhexyl, heptyl, octyl, nonyl, decyl, undecyl and dodecyl. Examples of alkoxy and hydroxyalkoxy are: methoxy, ethoxy, propoxy, butoxy, pentoxy, hexoxy, β-hydroxyethoxy, γ-hydroxypropoxy, δ-hydroxybutoxy and ω-hydroxyhexoxy.

The electron acceptor can be, for example, elemental halogen ($Cl_2$, $Br_2$, $I_2$) or preferably a halogen-containing organic compound which eliminates halogen with or without the supply of energy and forms a charge-transfer complex (donor) $(halogen)_x$ in which $0.3 > x < 0.9$ with a compound of the formula I and/or Ia (donor). Preferably $0.3 > x < 0.8$ and in particular x is 0.5 for Cl and Br as halogen and x is 0.76 for I as halogen. The energy can be, for example, thermal energy or radiation energy. Thermal energy is, for example, a temperature from room temperature to 300° C., in particular 50° to 250° C., and very particularly 80°–170° C. The halogen-containing, in particular Cl-, Br- or I-containing organic compound can be a halogenated, saturated or unsaturated, aliphatic, cycloaliphatic, aliphatic-heterocyclic, aromatic or heteroaromatic organic compound which can be substituted by —CN, HO—, =O,$C_1$–$C_4$alkyl, $C_1$–$C_4$alkoxy, —CO—$C_1$–$C_4$alkyl, —COO$C_1$–$C_4$alkyl. The halogen compounds can be used individually or in mixtures. The organic compound is preferably chlorinated, brominated and/or iodinated. The compounds can be monohalogenated, for example N-brominated or N-chlorinated dicarboximides. C-halogenated compounds advantageously have a higher degree of halogenation; preferably, these compounds are at least 80% C-halogenated, in particular C-brominated and/or C-chlorinated. Compounds whose halogen atoms are activated by electron-withdrawing groups are particularly favourable. Particularly preferably, the halogen-containing compound comprises perchlorinated $C_3$–$C_5$alkanes, $C_3$–$C_5$alkenes or organic compounds having trichloromethyl groups.

Examples of halogenated organic compounds are tetrabromomethane, bromoform, trichlorobromomethane, hexachloropropene, hexachlorocyclopropane, hexachlorocyclopentadiene, hexachloroethane, octachloropropane, n-octachlorobutane, n-decachlorobutane, tetrabromoethane, hexabromoethane, tetrabromo-o-benzoquinone, 2,4,4,6-tetrabromo-2,5-cyclohexadienone, hexabromobenzene, chloranil, hexachloroacetone, 1,4,5,6,7,7-hexachloro-5-norbornene-2,3-dicarboxylic acid, 1,2,5,6,9,10-hexabromocyclododecane, tetrachloroethylene, perchlorocyclopentadiene, perchlorobutadiene, dichloroacetaldehyde diethyl acetal, 1,4-dichloro-2-butene, 1,3-dichloro-2-butene, 3,4-dichloro-1-butene, tetrachlorocyclopropene, 1,3-dichloroacetone, 2,3,5,6-tetrachloro-p-xylene, 1,4-bis(-trichloromethyl)benzene, 1,3-dibromopropane, 1,6-dibromohexane, ethyl 3-chloropropionate, 3-chlorotoluene, methyl 2-chloropropionate, 2-chloroacrylonitrile, ethyl trichloroacetate, tris(trichloromethyl)triazine, 1,3-trichloropropane, 1,1,2-trichloroethane, butyl chloroformate, trichloroethylene, 2,3-dichloromaleic anhydride, 1,12-dibromododecane, α,α'-dibromo-p-xylene, α,α'-dichloro-o-xylene, phenacyl chloride or phenacyl bromide, 1,10-dibromodecane, α,α'-dichloro-p-xylene, α,α'-dibromo-m-xylene, iodoacetonitrile, 2,3-dichloro-5,6-dicyanobenzoquinone, methyl 2,3-dichloropropionate, 1-bromo-2-chloroethane, 1-bromo-2-chloropropane, 2-bromoethyl chloroformate, ethyl iodoacetate, N-chloro-, N-bromo- or N-iodosuccinimide or -phthalimide, or mixtures of two or more of these halogenated compounds.

Further suitable electron acceptors are, for example $O_2$ or salts of cations which act as oxidizing agents with non-nucleophilic anions, for example halogen ($F^{\ominus}$, $Cl^{\ominus}$), $BF^{\ominus}_4$, $SbF^{\ominus}_6$, $AsF^{\ominus}_6$ and $PF^{\ominus}_6$. Examples of cations are those of transition metals or rare earth metals [Fe(III), Co(III), Ce(IV)] or nonmetal cations, for example $NO^{\oplus}$. Examples are $NOBF_4$, $FeCl_3$ or $Co(PF_6)_3$.

The substrates used can be different solid materials, for example metals, glass, ceramics, paper and polymers. Preferably, glass is used as the substrate. In the case that the substrate is a swellable polymer, the needle network can in part be embedded in the surface.

The needle network can furthermore be coated with a metal, for example, a semi-noble or noble metal. Examples of metals are Cu, Ag, Au, Pt, Ir, Co, Ni and Cr.

A protective layer can be coated onto the needlework, in particular protective layers consisting of linear, branched or structurally crosslinked polymers, for example thermosetting plastics, thermoplastics or elastomers.

Examples of polymers are:

1. Polymers of monoolefins and diolefins, for example polypropylene, polyisobutylene, poly-1-butene, polymethyl-1-pentene, polyisoprene or polybutadiene and polymers of cycloolefins, for example of cyclopentene or norbornene; furthermore polyethylene, for example polyethylene of high density (HDPE), polyethylene of low density (LDPE), linear polyethylene of low density (LLDPE).

2. Mixtures of the polymers mentioned in 1), for example mixtures of polypropylene with polyisobutylene, polypropylene with polyethylene (for example PP/HDPE, PP/LDPE) and mixtures of various polyethylene types (for example LDPE/HDPE).

3. Copolymers of monoolefins and diolefins with one another or with other vinyl monomers, for example ethylene/propylene copolymers, propylene/1-butene copolymers, propylene/isobutylene copolymers, ethylene/1-butene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers, and terpolymers of ethylene with propylene and a diene, such as hexadiene, dicyclopentadiene or ethylidenenorbornene; further mixtures of these copolymers with one another and with polymers mentioned in 1), for example polypropylene/ethylene/propylene copolymers, LDPE/ethylene/vinyl acetate copolymers, LDPE/ethylene acrylic ester copolymers, LLDPE/ethylene/vinyl acetate copolymers and LLDPE/ethylene/acrylic ester copolymers.

4. Polystyrene, poly(p-methylstyrene), poly(α-methylstyrene).

5. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene, for example styrene/butadiene/styrene, styrene/isoprene/styrene, styrene/ethylene-butylene/styrene, styrene/ethylene-propylene/styrene or styrene/4-vinylpyridine/styrene.

6. Graft copolymers of styrene or α-methylstyrene, for example styrene on polybutadiene, styrene on polybutadiene/styrene or polybutadiene/acrylonitrile copolymers, styrene and acrylonitrile, or methacrylonitrile, on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers, and their mixtures with the copolymers mentioned in 5), for example such as are known as ABS, MBS, ASA or AES polymers.

7. Halogen-containing polymers, for example polychloroprene, chlorinated rubber, chlorinated or chlorosulfonated polyethylene, epichlorohydrin homopolymers and copolymers, in particular polymers of halogen-containing vinyl compounds, for example polyvinyl chloride, polyvinylidene chloride, polyvinyl fluoride, polyvinylidene fluoride; and their copolymers, such as vinyl chloride/vinylidene chloride, vinyl chloride/vinyl acetate or vinylidene chloride/vinyl acetate.

8. Polymers which are derived from derivatives of α,β-unsaturated acids, such as polyacrylates, polymethacrylates and polyacrylonitriles.

9. Copolymers of the monomers mentioned in 8) with one another or with other unsaturated monomers, for example acrylonitrile/butadiene copolymers, acrylonitrile/alkyl acrylate copolymers, acrylonitrile/alkoxyalkyl acrylate copolymers, acrylonitrile/vinyl halide copolymers, acrylonitrile/alkyl methacrylate/butadiene terpolymers or alkyl methacrylate/4-vinylpyridine copolymers.

10. Polymers which are derived from acyl derivatives or acetals of unsaturated alcohols, such as polyvinyl acetate, polyvinyl stearate, polyvinyl benzoate, polyvinyl maleate, polyvinylbutyral, polyallyl phthalate; and their copolymers with olefins mentioned in 1.

11. Homopolymers and copolymers of cyclic ethers, such as polyalkylene glycols, polyethylene oxide, polypropylene oxide or polybutylene glycol.

12. Polyacetals, such as polyoxymethylene, and those polyoxymethylenes which contain comonomers, for example ethylene oxide; polyacetals which are modified by thermoplastic polyurethanes, acrylates or MBS.

13. Polyphenylene oxides and polyphenylene sulfides and their mixtures with styrene polymers.

14. Polyurethanes which are derived from polyethers, polyesters and polybutadienes which have terminal hydroxyl groups on the one hand, and aliphatic or aromatic polyisocyanates on the other, and their precursors.

15. Polyureas, polyimides and polybenzimidazoles. Of the polyimides, in particular soluble polyimides are preferred, for example as described in German Auslegeschrift 1,962,588, EP-A 132,221, EP-A 134,752, EP-A 162,017, EP-A 181,837 and EP-A 182,745.

16. Polycarbonates, polyesters, for example polyalkylene terephthalates, and polyester carbonates.

17. Polysulfones, polyether sulfones and polyether ketones.

18. Polyvinylcarbazole.

19. Crosslinked acrylic resins which are derived from substituted acrylic esters, for example from epoxy acrylates, urethane acrylates or polyester acrylates, for example esters of polyols such as glycols, trimethylolpropane, pentaerythritol or polyepoxides.

20. Crosslinked epoxy resins which are derived from polyepoxides, for example from bisglycidyl ethers or from cycloaliphatic diepoxides. They can be crosslinked, for example, with anhydrides, thermally by using curing accelerators or by exposure to UV radiation.

21. Polymer homologue chemically modified derivatives of cellulose, such as cellulose acetates, cellulose propionates and cellulose butyrates, and cellulose ethers, such as methylcellulose.

22. Mixtures (polyblends) of the abovementioned polymers, for example PP/EPDM, PVC/EVA, PVC/ABS, PVC/MBS, PC/ABS, PC/ASA, PC/PBT, PVC/CPE, PVC/acrylate, POM/thermoplastic PUR, PC/thermoplastic PUR, POM/acrylate, POM/MBS, PPO/HIPS.

23. Products crosslinked with sulfur (vulcanized) consisting of polymers which contain double bonds, for example natural rubber, synthetic rubber, butadiene and isoprene polymers or copolymers.

24. Polyaddition product of expoxy compounds which have two epoxy groups with diols, disecondary diamines, primary amines or dicarboxylic acids, for example those of bisphenol A/diglycidyl ether and bisphenol A.

A preferred group of thermoplastic polymers comprises polyvinyl alcohol, polyolefins, polystyrene, polyvinyl chloride, polyvinylidene chloride, polyvinylidene fluoride, polyacrylate, polymethacrylates, polycarbonates, aromatic polysulfones, aromatic polyethers, aromatic polyether sulfones, polyimides and polyvinylcarbazols.

The polymers can additionally contain auxiliaries necessary for processing and application, for example plasticizers, flow-improving agents, mould-release agents, fillers, flame retardants, antioxidants and light stabilizers, stabilizers, colorants, pigments and conducting salts.

The protective layer can also consist of photo-crosslinked polymer systems. Photo-crosslinkable systems are described, for example, by G. E. Green et al. in J. Macro, Sci.-Revs. Macro. Chem., C21(2), 187-273 (1981-82).

The protective layer can be applied by generally customary coating processes for curable mixtures or polymer solutions, for example spread-coating, casting or knife-coating, if appropriate followed by removal of solvents and subsequent thermal and/or radiation-induced curing.

Suitable solvents for the polymers mentioned are, for example, polar aprotic or protic solvents, which can be used alone or in mixtures of at least two solvents. Examples are: water, alkanols such as methanol, ethanol, propanol, butanol, ethylene glycol monomethyl ether, diols such as ethylene glycol, propylene glycol and diethylene glycol, ethers such as dibutyl ether, tetrahydrofuran, dioxane, ethylene glycol dimethyl ether, diethylene glycol dimethyl ether, diethylene glycol diethyl ether, triethylene glycol dimethyl ether, halogenated hydrocarbons such as methylene chloride, chloroform, 1,2-dichloroethane, 1,1,1-trichloroethane, 1,1,2,2-tetrachloroethane, carboxylic esters and lactones such as ethyl acetate, methyl propionate, ethyl benzoate, 2-methoxyethyl acetate, γ-butyrolactone, δ-valerolactone and pivalolactone, carboxamides and lactams such N-methylformamide, N,N-dimethylformamide, N,N-diethylformamide, N,N-dimethylacetamide, N,N-diethylacetamide, γ-butyrolactam, ε-caprolactam, N-methylpyrrolidone, N-acetylpyrrolidone, N-methylcaprolactam, tetramethylurea, hexamethylphosphoric triamide, sulfoxides such as dimethyl sulfoxide, sulfones such as dimethyl sulfone, diethyl sulfone, trimethylene sulfone, tetramethylene sulfone, N-methylpyrrolidine, N-methylpiperidine, N-methylmorpholine, substituted benzenes such as benzonitrile, chlorobenzene, o-dichlorobenzene, 1,2,4-trichlorobenzene, nitrobenzene, toluene and xylene.

The invention also relates to a composition containing a) a compound of the formulae I or Ia or mixtures thereof

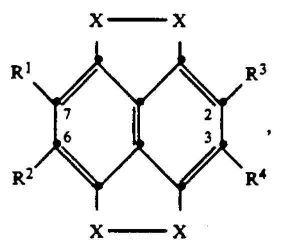

(I)

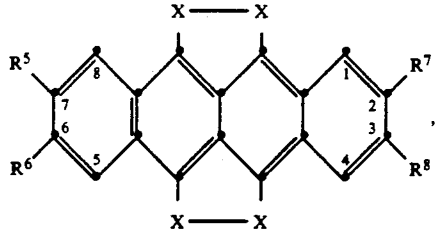

(Ia)

in which X is S, Se or Te, $R^1$, $R^2$, $R^3$ and $R^4$, independently of one another, are a hydrogen atom or Cl, or $R^1$ and $R^2$ and $R^3$ and $R^4$ together are each

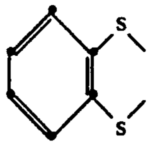 or 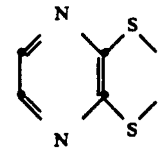 or $R^1$, $R^2$, $R^3$ and $R^4$ are each phenylthio, 4-methyl- or 4-methoxyphenylthio or 4-pyridylthio, $R^5$, $R^6$, $R^7$ and $R^8$, independently of one another, are H or F, $R^5$ is $CH_3$, and $R^6$, $R^7$ and $R^8$ are H, or $R^5$, $R^6$, $R^7$ and $R^8$ are $CH_3$, $R^5$ and $R^6$ are $CH_3$ or Cl, and $R^7$ and $R^8$ are H, or $R^5$ and $R^6$ are H, $R^7$ is $—COR^9$ and $R^8$ is H or $—COR^9$, or $R^5$ and $R^6$ are H, and $R^7$ and $R^8$ together are —CO—O—CO or $—CO—NR^{10}—CO—$ in which $R^9$ is halogen, —OH, $—NH_2$, or the radical of an alcohol, primary or secondary amine, or is —OM in which M is a cation and $R^{10}$ is H or the radical of a primary amine minus the $NH_2$ group, and b) a halogen-containing organic compound which eliminates halogen upon supply of energy.

In a preferred embodiment, the composition additionally contains an inert solvent, for example polar aprotic solvents, such as have been mentioned before. The preferred solvent is dimethylformamide.

Component a) is preferably present in an amount of 0.001 to 5% by weight, in particular 0.01 to 2% by weight, and in particular 0.01 to 1% by weight, relative to component b) and, if appropriate, an inert solvent.

Component b) is preferably present in excess, in particular if it simultaneously serves as solvent. In the case that a solvent is used, the excess can be, for example, the twenty-fold, preferably ten-fold and in particular five-fold amount, relative to component a).

The invention also relates to a process for the preparation of the support material according to the invention in which a composition according to the invention is applied to a substrate, the halogen-containing compound is then allowed to act on the compound of the formula I and/or Ia, while supplying energy, and the halogen-containing compound is removed.

The composition can be applied to the substrate, for example, by casting. The energy is preferably supplied in the form of thermal energy, for example by heating from room temperature to 300° C., preferably 50° to 250° C., and particularly 80° to 170° C., if appropriate in vacuo. Component b) is preferably contained in the composition according to the invention in excess.

In the case that the electron acceptor is a gas (for example $O_2$, halogens), the heating is advantageously carried out in a suitable gas atmosphere and a solvent is used for the compounds of the formula I and/or Ia. In the case that the electron acceptor is a salt of a cation which acts as an oxidizing agent, the support material is advantageously cleaned after the heat treatment, for example by washing with water.

The support material according to the invention has a high electric conductivity and is highly suitable for use as electric conductors. The support material can be converted to highly conducting materials by means of metallization, for example by connecting the support material in an electrolysis bath as the cathode and carrying out electrolysis.

It is also possible to peel off the polymer as a film from the material according to the invention which is coated with a polymer. This gives polymer films which are electrically conducting on one side and can also be used as electric conductors.

The invention also relates to a polymer film wherein a needle network of a CT complex of a) a compound of the formula I or Ia or mixtures thereof as the donor (I)

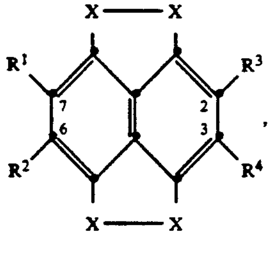

,

-continued (Ia)

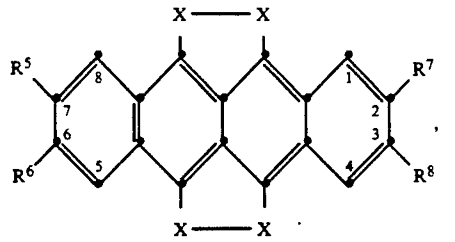

, in which X is S, Se or Te, $R^1$, $R^2$, $R^3$ and $R^4$, independently of one another, are a hydrogen atom or Cl, or $R^1$ and $R^2$ and $R^3$ and $R^4$ together are each

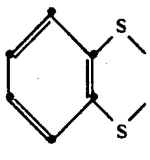 or 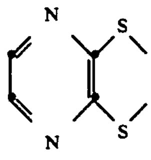 or or $R^1$, $R^2$, $R^3$ and $R^4$ are each phenylthio, 4-methyl- or 4-methoxyphenylthio or 4-pyridylthio, $R^5$, $R^6$, $R^7$ and $R^8$, independently of one another, are H or F, $R^5$ is $CH_3$, and $R^6$, $R^7$ and $R^8$ are H, or $R^5$, $R^6$, $R^7$ and $R^8$ are $CH_3$, $R^5$ and $R^6$ are $CH_3$ or Cl, and $R^7$ and $R^8$ are H, or $R^5$ and $R^6$ are H, $R^7$ is $—COR^9$ and $R^8$ is H or $—COR^9$, or $R^5$ and $R^6$ are H, and $R^7$ and $R^8$ together are $—CO—O—CO$ or $—CO—NR^{10}—CO—$ in which $R^9$ is halogen, $—OH$, $—NH_2$, or the radical of an alcohol, primary or secondary amine, or is $—OM$ in which M is a cation, and $R^{10}$ is H or the radical of a primary amine minus the $NH_2$ group, and b) an electron acceptor is embedded in one surface.

Suitable polymers are the ones mentioned above, including the preferences. In a preferred embodiment, the needle network is coated with a metal.

The polymer films can be prepared by coating a support material according to the invention with a polymer film and then peeling off the polymer film from the substrate. A particularly suitable substrate is glass.

The polymer films according to the invention can be laminated to give multi-layer films containing several electrically conducting layers.

Support materials according to the invention which are coated with photo-crosslinkable polymers can also be irradiated in a known manner under a photomask and then developed, it being possible for the CT complexes formed to be removed in the developed areas, if appropriate, mechanically, for example by wiping off. In this manner, conducting structures can be produced.

A preferred area of application, in addition to the preparation of antistatic and electrically conducting coatings and polymer films for electrostatic screening, is the use as electrodes which, depending on the polymer used, can be transparent.

The composition and polymer films according to the invention which contain a CT complex are distinguished by high chemical stability and temperature resistance and low migration of the CT complexes. Furthermore, surprisingly high conductivities are achieved, which can amount to up to 25% of the conductivity of the pure CT complexes. Under the preparation conditions, the CT complexes surprisingly form a network (intertwined needles) of electrically conducting crystal needles. The examples which follow illustrate the invention in more detail. The resistivity is determined by the four-point method.

EXAMPLE 1

1.6 mg of tetraselenotetracene are dissolved in 10 ml of DMF at 120° C. 3.5 μl of perchloropropene are then added, and the solution is poured onto a preheated glass plate. After evaporation of the solvent at temperatures between 90° and 130° C., a transparent needle network of electrically conducting crystallites remains. The resistivity is 0.4 Ωcm.

EXAMPLE 2

The support material according to Example 1 is coated with a solution of a polymer in a solvent. After evaporation of the solvent and peeling off from the glass support, a polymer film which is electrically conducting on one side and has unchanged conductivity remains. The preparation conditions are listed in Table 1.

TABLE 1

| Polymer | Solvent | Concentration of Polymer (w/w) | Evaporation temperature (°C.) |
|---|---|---|---|
| Poly(bisphenol A carbonate) | Methylene chloride | 10% | 50 |
| Poly(vinyl alcohol) | Water | 5% | 80 |
| Poly(bisphenol A carbonate) | Methylene chloride | 14% | 50 |
| Polyethylene | Xylene | 5% | 80 |
| Poly(imide)[1] | DMF | 15% | 100 |
| Poly(vinyl carbazole) | Nitrobenzene | 5% | 120 |
| Poly(vinyl cinnamate) | THF | 10% | 80 |

[1]Polyimide from benzophenonetetracarboxylic dianhydride, diaminodurol and 3,3''-dimethyl-5,5'-diethyl-4,4'-diaminodiphenylmethane ($\overline{M}_w$ = 40000)

EXAMPLE 3

Example 1 is repeated with a polyethylene terephthalate sheet instead of the glass support. In this case, too, a transparent needle network of electrically conducting crystallites is obtained which has crowned the swollen surface of the sheet. The resistivity is 3.2 Ωcm.

EXAMPLE 4

Example 1 is repeated with a chromium-metallized glass support. In this case, too, a needle network of electrically conducting crystallites is obtained. The resistivity of the needle network transferred in a film of polyvinyl alcohol is 0.4 Ωcm.

EXAMPLE 5

A support material according to Examples 1 and 3 is connected as a cathode in a commercially available sulfuric acid copper electrolysis bath. Copper is deposited on the needle network. The resistivity is 0.08 Ωcm.

EXAMPLE 6

A support material according to Example 4 is connected as the cathode in an acidic gold electrolysis bath. Gold is deposited on the needle network, while the chromium support is not metallized. The metallized needle network is coated with a 10% solution of polycarbonate in methylene chloride. After evaporation of the solvent and peeling off from the substrate, a polymer film which is electrically conducting on one side is obtained. Its resistivity is $10^{-2}$ Ωcm and the resistivity of a film prepared in an identical manner without gold-plating is 0.4 Ωcm.

EXAMPLE 7

1.65 mg of 2-fluorotetraselenotetracene are dissolved at 150° C. in 7.5 g of nitrobenzene with stirring. 2 ml of tribromomethane are added to the solution. 1.5 ml each of this solution are placed in temperature-controlled Petri dishes at 130°, 140°, 150°, 160° and 170° C. After evaporation of the solvent, an electrically conducting needle network remains in all cases.

EXAMPLE 8

In an analogous manner, conducting needle networks of 2,3-diflourotetraselenotetracene are prepared with tribromomethane and hexachloropropene in nitrobenzene as the solvent.

EXAMPLE 9

The needle network according to Example 7 is coated with a solution of 10 g of poly(vinyl cinnamate) and 0.5 g of thioxanthone in 50 ml of THF in a wet film thickness of 100 μm. After evaporation of the solvent, the resulting film is exposed to a 5 kW mercury high-pressure lamp through a mask for 30 seconds and developed by means of THF. This gives an electrically conducting pattern.

What is claimed is:

1. A solid substrate which is coated on at least one surface thereof with a needle network of a CT complex of a) a compound of the formula Ia as donor (Ia)

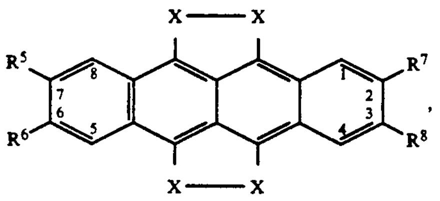

, in which X is S, Se or Te, $R^5$, $R^6$, $R^7$ and $R^8$, independently of one another are H or F, $R^5$ is $CH_3$ and $R^6$, $R^7$ and $R^8$ are H or $R^5$, $R^6$, $R^7$ and $R^8$ are $CH_3$, $R^5$ and $R^6$ are $CH_3$ or Cl and $R^7$ and $R^8$ are H or $R^5$ and $R^6$ are H, $R^7$ is —$COR^9$ and $R^8$ is H or —$COR^9$, or $R^5$ and $R^6$ are H and $R^7$ and $R^8$ together are —CO—O—CO or —CO—$NR^{10}$—CO— in which $R^9$ is halogen, —OH, —$NH_2$, or the radical of an alcohol, primary or secondary amine, or is —OM in which M is a cation, and $R^{10}$ is H or the radical of a primary amine minus the $NH_2$ group, and b) an electron acceptor.

2. A substrate according to claim 1, wherein component a) is tetrathiotetracene, tetraselenotetracene, 2-fluoro- or 2,3-difluorotetraselenotetracene.

3. A substrate according to claim 1, wherein the electron acceptor b) is a halogen-containing organic compound which eliminates halogen upon supply of energy.

4. A substrate according to claim 3, wherein the halogen-containing compound is a halogenated, saturated or unsaturated, aliphatic, cycloaliphatic, aliphatic-heterocyclic, aromatic or heteroaromatic organic compound.

5. A substrate according to claim 4, wherein the organic compound is chlorinated, brominated and/or iodinated.

6. A substrate according to claim 3, wherein the halogen-containing compound is a perchlorinated $C_3$–$C_5$alkane, $C_3$–$C_5$alkene or organic compound which has trichloromethyl groups.

7. A substrate according to claim 3, wherein the halogen-containing organic compound is tetrabromomethane, bromoform, trichlorobromomethane, hexachloropropene, hexachlorocyclopropane, hexachlorocyclopentadiene, hexachloroethane, octachloropropane, n-octachlorobutane, n-decachlorobutane, tetrabromoethane, hexabromoethane, tetrabromo-o-benzoquinone, 2,4,4,6-tetrabromo-2,5-cyclohexadienone, hexabromobenzene, chloranile, hexachloroacetone, 1,4,5,6,7,7-hexachloro-5-norbornene-2,3-dicarboxylic acid, 1,2,5,6,9,10-hexabromocyclododecane, tetrachloroethylene, perchlorocyclopentadiene, perchlorobutadiene, dichloroacetaldehyde diethyl acetal, 1,4-dichloro-2-butene, 1,3-dichloro-2-butene, 3,4-dichloro-1-butene, tetrachlorocyclopropene, 1,3-dichloroacetone, 2,3,5,6-tetrachloro-p-xylene, 1,4-bis(-trichloromethyl)benzene, 1,3-dibromopropane, 1,6-dibromohexane, ethyl 3-chloropropionate, 3-chlorotoluene, methyl 2-chloropropionate, 2-chloroacrylonitrile, ethyl trichloroacetate, tris(trichloromethyl)triazine, 1,,3-trichloropropane, 1,1,2-trichloroethane, butyl chloroformate, trichloroethylene, 2,3-dichloromaleic anhydride, 1,12-dibromododecane, α,α'-dibromo-p-xylene, α,α'-dichloro-o-xylene, phenacyl chloride or phenacyl bromide, 1,10-dibromodecane, α,α'-dichloro-p-xylene,α,α'-dibromo-m-xylene, iodoacetonitrile, 2,3-dichloro-5,6-dicyanobenzoquinone, methyl 2,3-dichloropropionate, 1-bromo-2-chloroethane, 1-bromo-2-chloropropane, 2-bromoethyl chloroformate, ethyl iodoacetate, N-chloro-, N-bromo- or N-iodosuccinimide or -phthalimide, or mixtures thereof.

8. A substrate according to claim 1, wherein the substrate consists of glass.

9. A substrate according to claim 1, wherein the exposed surface of needle network coating is coated with a metal.

10. A substrate according to claim 1, wherein a protective layer is present on the exposed surface of the needle network coating.

* * * * *